United States Patent
Brennecke et al.

(10) Patent No.: US 9,311,312 B2
(45) Date of Patent: Apr. 12, 2016

(54) PROCESS FOR ELECTRONIC ARCHIVING OF DATA OBJECTS AND COMPUTER PROGRAM PRODUCT

(71) Applicants: cp.media AG, Baar (CH); AIRBUS OPERATIONS GmbH, Hamburg (DE)

(72) Inventors: Burkhardt Brennecke, Berlin (DE); Olaf Feller, Ribeauville (FR); Gunnar Wiebecke, Hamburg (DE)

(73) Assignees: cp.media AG, Baar (CH); AIRBUS OPERATIONS GmbH, Hamburg (DE)

( * ) Notice: Subject to any disclaimer, the term of this patent is extended or adjusted under 35 U.S.C. 154(b) by 133 days.

(21) Appl. No.: 14/265,608

(22) Filed: Apr. 30, 2014

(65) Prior Publication Data

US 2014/0324783 A1    Oct. 30, 2014

(30) Foreign Application Priority Data

Apr. 30, 2013   (DE) .................. 10 2013 104 424

(51) Int. Cl.
    *G06F 7/02* (2006.01)
    *G06F 17/30* (2006.01)
    *G06F 9/48* (2006.01)
(52) U.S. Cl.
    CPC ........ *G06F 17/30073* (2013.01); *G06F 9/4881* (2013.01); *G06F 17/3033* (2013.01); *G06F 17/30097* (2013.01)
(58) Field of Classification Search
    CPC ............. G06F 17/30773; G06F 2221/2107; G06F 17/30097; G06F 17/3033
    See application file for complete search history.

(56) References Cited

U.S. PATENT DOCUMENTS

| | | | | |
|---|---|---|---|---|
| 8,892,532 | B2 * | 11/2014 | Sogtrop | G06F 17/30011 707/661 |
| 2011/0099388 | A1 * | 4/2011 | Hett | G06F 21/645 713/193 |
| 2014/0046906 | A1 * | 2/2014 | Patiejunas | G06F 17/30073 707/661 |

OTHER PUBLICATIONS

Technical Guideline 03125 of the Federal Office of Information Security (BSI) v1.1 (Feb. 18, 2011), from https://www.bsi.bund.de/EN/Publications/TechnicalGuidelines/TR03125/BSITR03125_Previous_Version.html on Jan. 5, 2016.*

* cited by examiner

*Primary Examiner* — Bruce Moser
(74) *Attorney, Agent, or Firm* — Harness, Dickey

(57) ABSTRACT

The application relates to a method for the electronic archiving of data objects by means of a data processing device, wherein the method comprises the following steps: receipt of a hash value tuple comprising one or a plurality of hash values, wherein each hash value is assigned to a data object, receipt of time information on the hash value tuple indicating a time period within which the hash values of the hash value tuple should be electronically archived and comparison of the time information with a predetermined time specification, wherein archiving steps are carried out if the time information specifies a time period for electronic archiving that is shorter than the predetermined time specification. The application furthermore relates to a computer program product.

10 Claims, 1 Drawing Sheet

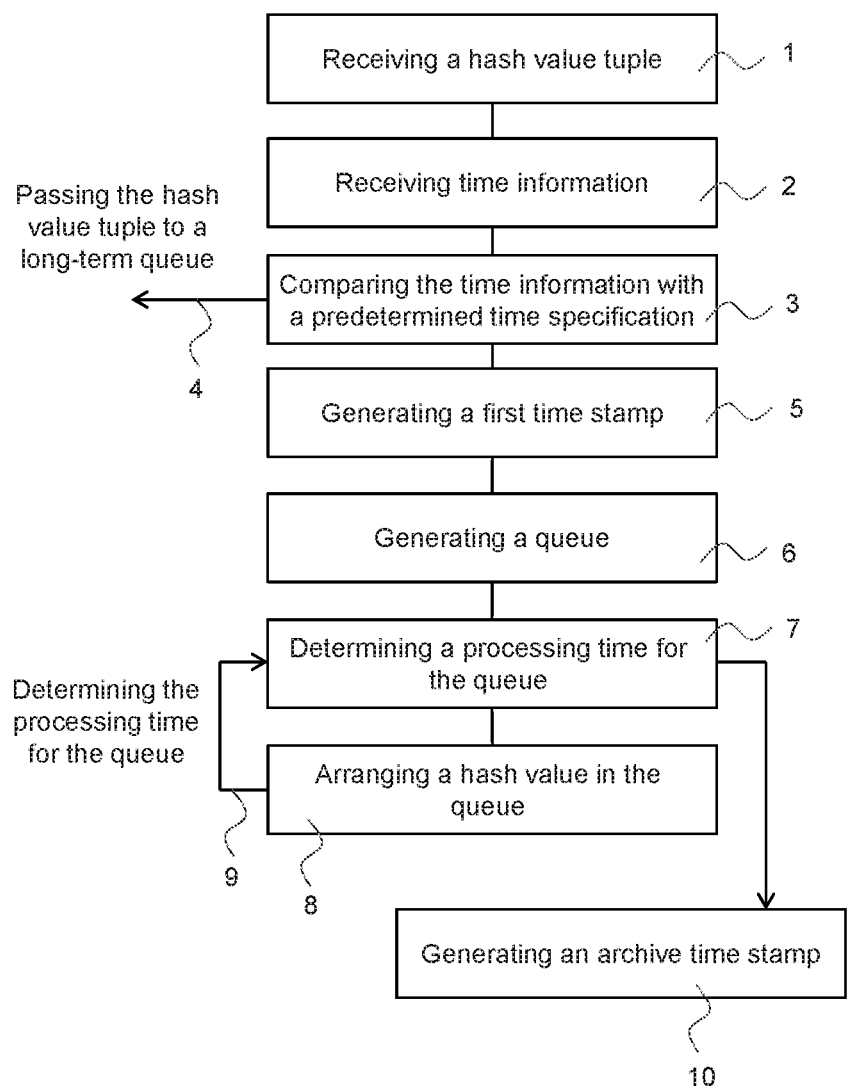

PROCESS FOR ELECTRONIC ARCHIVING OF DATA OBJECTS AND COMPUTER PROGRAM PRODUCT

The invention relates to a method for the electronic archiving of data objects by means of a data processing device and a computer program product.

BACKGROUND OF THE INVENTION

Various methods and standards for the electronic archiving of data objects are known in the art, the ArchiSig project for example. It is envisaged here that a plurality of data objects or hash values assigned thereto are arranged in a queue. An archive time stamp is then created in that a reduced hash tree is generated for all elements (data objects/hash values) in the queue and signed. When there are large and/or very many elements, it may take several hours before archiving is complete. It is not possible in this case for archiving targets within a predetermined time to be met. Instead, archiving takes place "over the course of the day", which is also entirely adequate for some applications.

The ArchiSig project is described in Technical Guideline 03125 of the Federal Office for Information Security.

SUMMARY OF THE INVENTION

The problem addressed by the invention is that of specifying technologies for the electronic archiving of data objects which make a deterministic archiving process possible.

The problem is solved by a method according to claim 1 and a computer program product according to claim 10. Preferred embodiments of the invention are the subject matter of the dependent claims.

According to one aspect of the invention, a method for the electronic archiving of data objects by means of a data processing device is provided. The method comprises the following steps. A hash value tuple comprising one or a plurality of hash values is received, wherein each value is assigned to a data object. Time information is received on the hash value tuple, indicating a time period within which the hash values of the hash value tuple should be electronically archived. The time information is compared with a predetermined time specification. If the time information specifies a time period for electronic archiving that is shorter than the predetermined time specification, the following steps are carried out:
 a) A first time stamp is generated for a hash value and assigned to the hash value.
 b) A queue is created for further processing of the hash values.
 c) A processing time is determined for electronic archiving of the hash values in the queue. The processing time is obtained from the total time required for electronic archiving of the hash values already in the queue and the time required for electronic archiving of an additional hash value.
 d) A hash value is placed in the queue when the processing time is shorter than the predetermined period of time.
 e) Steps c) and d) are repeated until a processing time is determined at step c) which is greater than the predetermined period of time.
 f) An archive time stamp is then generated for the hash values in the queue and assigned to these.

According to a further aspect of the invention, a computer program product is provided comprising a program on a physical memory which implements a method for the electronic archiving of data objects during processing in a data processing device.

The method enables electronic archiving of data objects, for example documents, to be carried out with a predetermined time specification. For example, it may be provided in a production process that every production step is logged. Once a step has been executed and logged, the following production step is only introduced when it is certain that the documentation for the preceding production step is electronically archived. In this way, legally compliant logging should be guaranteed. If many documents are generated during a production step, archiving cannot be guaranteed within a predetermined and possibly very short window of time.

A hash value tuple comprising one or a plurality of hash values is initially received. Each hash value is assigned to a data object, for example a text document, an audio file or a video file. The data object may also comprise a combination of the aforementioned formats. Time information is received on the hash value tuple. This indicates a time period within which all hash values of the tuple should be electronically archived. The time information is compared with a predetermined time specification which is defined by a cycle of a production run, for example.

If the time information is shorter than the predetermined time specification, the following steps are then carried out, in order to guarantee prompt archiving. A first time stamp is initially generated for a hash value and assigned thereto. A first archiving step is thereby achieved. If the data processing device on which the method is implemented should fail at this point, at least a basic level of security has been achieved. A queue is generated for further processing of the hash values. This queue contains a number of hash values, such that the time taken to process the hash values in the queue is still shorter than the predetermined time specification. When this limit is reached, the hash values in the queue are archived. The queue processing time is substantially determined by the time (required) for production of an archive hash value in each case for the hash values in the queue. If a setting time that cannot be neglected is required for the setting of one or a plurality of hash values in the queue, this must likewise be taken into account when determining the processing time. An archive hash value is generated for each hash value. The archive hash values may, for example, be arranged in an archive hash tree. It may be provided that a single archive time stamp is generated for the tip of the archive hash tree and assigned thereto. The more hash values placed in the queue, the longer it takes for the individual archive hash values to be generated. By processing the queue within the predetermined time specification, it is guaranteed that the hash values are electronically archived in time.

The method is carried out by means of a data processing device. The data processing device may, for example, comprise one or a plurality of processors and a memory with a volatile (e.g. random access memory) and/or a non-volatile (e.g. hard disk) storage area. Furthermore, the data processing device may have communications devices for receiving and/or transmitting data and/or data streams, for example a network connection (LAN—local area network), a wireless network connection (WLAN—wireless local area network), a USB connection (USB—universal serial bus), a Bluetooth adapter and/or a FireWire connection (IEEE 1394). The data processing device may be connected to a display device. Alternatively, a display device may be integrated into the data processing device.

Electronic time stamps are generally digital data according to ISO18014-1, with which the existence of certain data can be proved before a given point in time. Frequently, as in the case of the time stamp protocol from RFC3161, for example, time stamps are created using digital signatures. Consequently, time stamps are an electronic certification that data signed with the time stamp were present in the signed form at the time of signing. Electronic time stamps may be created as advanced or qualified time stamps.

An advanced time stamp (also referred to as an advanced electronic signature) is an electronic signature that enables the authenticity and genuineness of the data signed by it to be checked. According to EC Directive 1999/93/EC, an advanced time stamp should meet the following requirements. It should be assigned exclusively to one signatory. Identification of the signatory should be guaranteed. The advanced time stamp should be generated using means which the signatory can keep under its sole control. Finally, the advanced time stamp should be linked to the data to which it relates in such a manner that any subsequent change of the data can be detected. An advanced time stamp is usually generated by means of a software application. The software application enables different advanced time stamps to be generated in succession over a short period of time. Typically, the time taken to generate an advanced time stamp is roughly 50 ms.

A qualified time stamp (also referred to as a qualified electronic signature) is understood to mean an advanced electronic signature which is based on a certificate that was valid and qualified at the time of its generation and was created using a secure signature creation device (SSEE). Qualified time stamps can only be created by accredited suppliers (trusted timestamp authority). Electronic data with a qualified time stamp can be checked for their validity for a period of at least 30 years. The qualified time stamp means that there is a high standard of protection against data falsification. The qualified time stamp is usually created by means of a signature card which is read out by a reading device. It therefore usually takes longer to generate a qualified time stamp than to generate an advanced time stamp. It usually takes approximately 0.25 s to 1.6 s to generate a qualified time stamp.

It may be provided according to one embodiment that the first time stamp is an advanced or qualified time stamp. For example, the first time stamp may be generated in compliance with the guidelines laid down in protocol RFC3161.

According to one development, the first time stamp comprises a public key which was used to generate the first time stamp. The requirements in relation to the security of electronic archiving are governed differently in different jurisdictions. For example, an advanced time stamp which comprises the public key used for its generation is regarded as adequate archiving. If there is a system crash while the process is being executed, at least a basic level of security is thereby guaranteed. A first time stamp of this kind is migratable.

A further development envisages that the archive time stamp is an advanced or qualified time stamp. It may be provided that the archive time stamp is generated according to the specifications of protocols RFC4998 or RFC6283. The structures for an evidence record defined using these protocols correspond to the Long-Term Archiving and Notary Service (LTANS) specification. The format thereby defined is suitable for new signing later. New signing at given intervals of time may be necessary if the archive time stamp fades. Fading means that the hash algorithm used to generate the archive time stamp and/or the encoding algorithm for the time stamp are no longer cryptographically secure.

It may furthermore be provided that additional information is generated on the time stamp and assigned to the hash values in the queue. The additional information may comprise blocking information, for example the Online Certificate Status Protocol (OCSP) or a blacklist The OCSP is an Internet protocol which enables the status of certificates (e.g. X.509 certificates) to be queried during a validation service. The protocol is needed for checking digital signatures, among other things. Furthermore, it is used during authentication in communication protocols (e.g. with SSL) or for sending encoded e-mails. Checks are made to see whether certificates used to check the signature, to identify the communication partners or for encoding were blocked and therefore invalid before the end of their standard validity period. The blacklist provides information on suppliers and/or signature cards which are classified as invalid. The additional information is preferably generated along with the archive time stamp. The additional information should be current at the time of its generation.

According to a further embodiment, it is provided that when the archive time stamp is generated, a reduced hash tree is created. A hash value is usually created to generate a time stamp for a data object, which hash value is assigned to the data object. The hash value is then provided with the time stamp and signed. In order to archive a plurality of data objects or hash values (which are already assigned to data objects), an archive hash tree may be produced. A hash tree is generally a data structure which forms a tree of hash values. The archive hash tree may be a binary tree. This involves a rooted tree in which each node has a maximum of two subordinate nodes. Alternatively, the archive hash tree may be a tree with more than two subordinate nodes per root. The reduced archive hash tree contains only the hash values allowing the next subordinate node to be calculated in each case. From each level in the complete hash tree, only one hash value is contained in the reduced archive hash tree in each case.

A further development envisages that a further queue is generated at step b) and steps c) to f) are implemented for the further queue. In this way, load-balancing is implemented for archiving. It may furthermore be provided that a plurality of queues is generated. For example, a plurality of queues may be created in parallel timewise, in order to enable large hash value tuples to be processed in a short predetermined time. Each queue is filled with hash values, so that the (parallel) processing of hash values then takes place within the predetermined time. Resources of the data processing device must be adapted to an anticipated variable of hash value tuples where necessary, for example the processor output and/or the random access memory. It may be envisaged that a plurality of devices is provided to generate advanced or qualified time stamps, in order to allow prompt processing. For example, each queue may be linked to a device for generating time stamps exclusively assigned thereto.

It may likewise be provided that further hash values of a further hash value tuple, the time information of which indicates a time period for electronic archiving which is greater than the aforementioned time period, are placed in a long-term queue and a further archive time stamp is generated and assigned to the further hash values in the long-term queue. Hash values for which archiving is non-time-critical are arranged in the long-term queue. If both hash value tuples for which the processing is time-critical, in other words it should take place within the predefined time specification, and also tuples with non-time-critical hash values are received in parallel, the processing can be divided up in this way. Processing of the long-term queue may be deferred, for example, until the time-critical tuples are archived. Alternatively, the processing of the long-term queue may take place in parallel if there are sufficient resources available.

The format of the archive time stamp may be consistent with the format of the further archive time stamp. In this way, any new signing that may prove necessary is simplified.

All known embodiments for the method may be implemented and realized by means of the computer program product.

DESCRIPTION OF EXEMPLARY EMBODIMENTS

The invention is described in greater detail below with the help of exemplary embodiments. In this case, FIG. 1 shows a flow chart of a method for the electronic archiving of data objects.

In step (1) a hash value tuple is received. The tuple may comprise any number of hash values. Time information on the hash value tuple is received in step (2). The time information indicates the time within which the hash values of the tuple are to be archived. The time information is compared in step (3) with a predetermined time specification. Depending on the result of the comparison, the following steps are implemented.

If the time information is greater than the predetermined time period, the archiving is classified as non-time-critical. In step (4) the hash value tuple is passed on to a long-term queue for further processing.

If, however, the time information is shorter than the predetermined time period, time-critical processing must be guaranteed. A first time stamp is initially generated for a hash value (step (5)), for example an advanced time stamp. The first time stamp preferably comprises the public key which is used to generate it. Next, a queue is generated in step (6). The processing time for the queue is determined in step (7). The processing time is substantially determined by the time for generating an archive hash value for each hash value in the queue. If the processing time is shorter than the predetermined time, a hash value is arranged in the queue in step (8). The processing time for the queue is then determined again (step (9)). If there is still space left in the queue, an additional hash value is placed in the queue. As each additional hash value is added to the queue, the processing time of the queue moves closer to the predetermined time specification. The loop from steps (7) to (9) is repeated, so that when a further hash value is added, the processing time of the queue would be greater than the predetermined time specification. In this case, the loop is broken and the queue processed.

Finally, an archive time stamp for the hash values in the queue is generated in step (10) and assigned to these values. For this purpose, an archive hash value is generated for each hash value in the form of a reduced hash tree, for example.

The features disclosed in the preceding description, claims and FIGURE may be important for the realization of the invention, both independently and also in any combination with one another.

The invention claimed is:

1. A method for the electronic archiving of data objects by means of a data processing device, wherein the method comprises the following steps:

receipt of a hash value tuple comprising one or a plurality of hash values, wherein each hash value is assigned to a data object, receipt of time information on the hash value tuple indicating a time period within which the hash values of the hash value tuple are electronically archived and comparison of the time information with a predetermined time specification, wherein the following steps are carried out if the time information specifies a time period for electronic archiving that is shorter than the predetermined time specification:

a) generation and assignment of a first time stamp to a hash value, b) generation of a queue for further processing of hash values, c) determination of a processing time for electronic archiving of hash values in the queue, wherein the processing time is obtained from the total time required for electronic archiving of hash values already in the queue and the time required for electronic archiving of an additional hash value, d) placing of a hash value in the queue when the processing time is shorter than the predetermined time specification, e) repetition of steps c) and d) until a processing time is determined at step c) which is greater than the predetermined time specification, then f) generation and assignment of an archive time stamp for the hash values in the queue.

2. The method according to claim 1, wherein the first time stamp is an advanced or qualified time stamp.

3. The method according to claim 1, wherein the first time stamp comprises a public key which was used to generate the first time stamp.

4. The method according to claim 1, wherein the archive time stamp is an advanced or qualified time stamp.

5. The method according to claim 1, wherein additional information is generated on the time stamp and assigned to the hash values in the queue.

6. The method according to claim 1, wherein a reduced hash tree is created when the archive time stamp is generated.

7. The method according to claim 1, wherein a further queue is generated at step b) and steps c) to f) are implemented for the further queue.

8. The method according to claim 1, wherein further hash values of a further hash value tuple, the time information of which indicates a time period for electronic archiving which is greater than the aforementioned time period, are placed in a long-term queue and a further archive time stamp is generated and assigned to the further hash values in the long-term queue.

9. The method according to claim 8, wherein the format of the archive time stamp is consistent with the format of the further archive time stamp.

10. A computer program product comprising a program on a physical memory which implements a method according to claim 1, during processing in a data processing device.

* * * * *

UNITED STATES PATENT AND TRADEMARK OFFICE
CERTIFICATE OF CORRECTION

Page 1 of 1

PATENT NO.         : 9,311,312 B2
APPLICATION NO.    : 14/265608
DATED              : April 12, 2016
INVENTOR(S)        : Brennecke et al.

It is certified that error appears in the above-identified patent and that said Letters Patent is hereby corrected as shown below:

In the specification

Column 1
Line 4                  insert -- CROSS-REFERENCE TO RELATED APPLICATIONS
                        This application claims priority to German Application No.
                        102013104424.7 filed on April 30, 2013. The disclosure of the
                        above application is incorporated herein by reference --.

In the claims

Column 6
Line 14, claim 1        before "hash" insert -- the --.

Signed and Sealed this
Fifth Day of July, 2016

Michelle K. Lee
*Director of the United States Patent and Trademark Office*